Sept. 7, 1948.  D. D. PEEBLES ET AL  2,448,733
POWDER FILLING APPARATUS
Filed Sept. 20, 1943  5 Sheets-Sheet 1
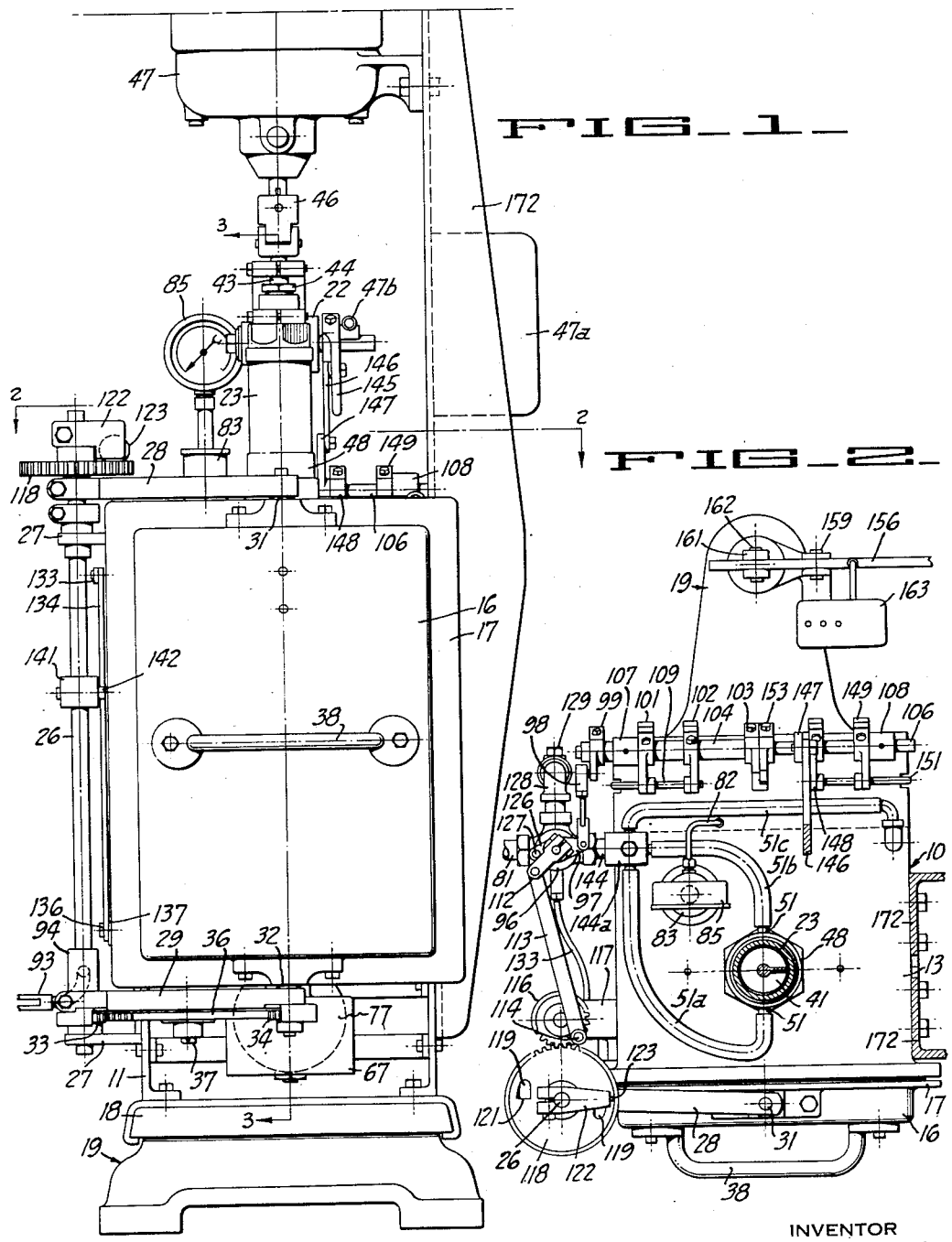
INVENTOR
DAVID D. PEEBLES,
GUY P. HENSLEY.
BY Paul D Fuhr
ATTORNEY Sept. 7, 1948.　　　　　D. D. PEEBLES ET AL　　　　2,448,733
POWDER FILLING APPARATUS
Filed Sept. 20, 1943　　　　　　　　　　　　　　5 Sheets-Sheet 2
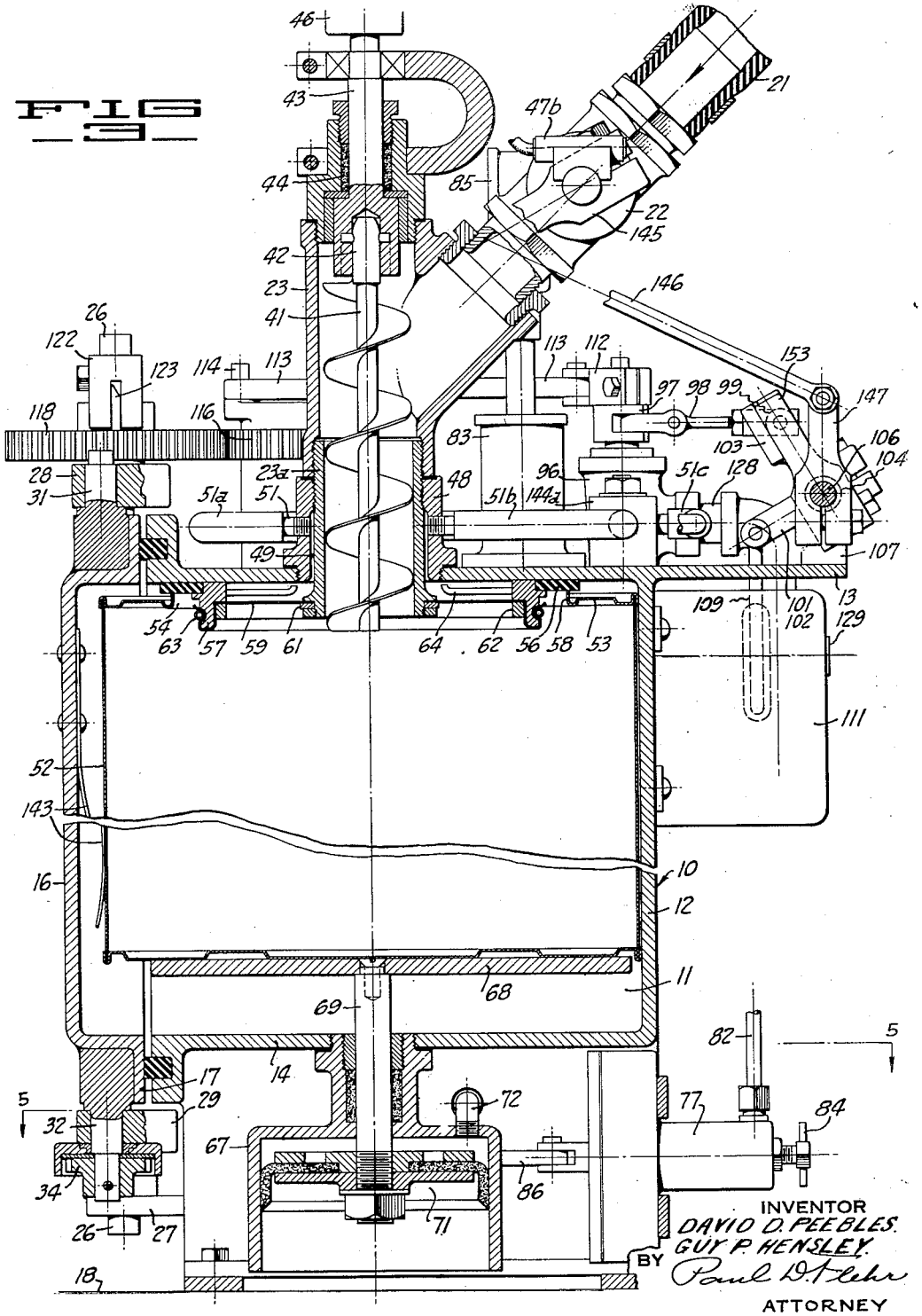
INVENTOR
DAVID D. PEEBLES.
GUY P. HENSLEY.
BY Paul D. Flehr
ATTORNEY Sept. 7, 1948.　　　D. D. PEEBLES ET AL　　　2,448,733
POWDER FILLING APPARATUS
Filed Sept. 20, 1943　　　5 Sheets-Sheet 3
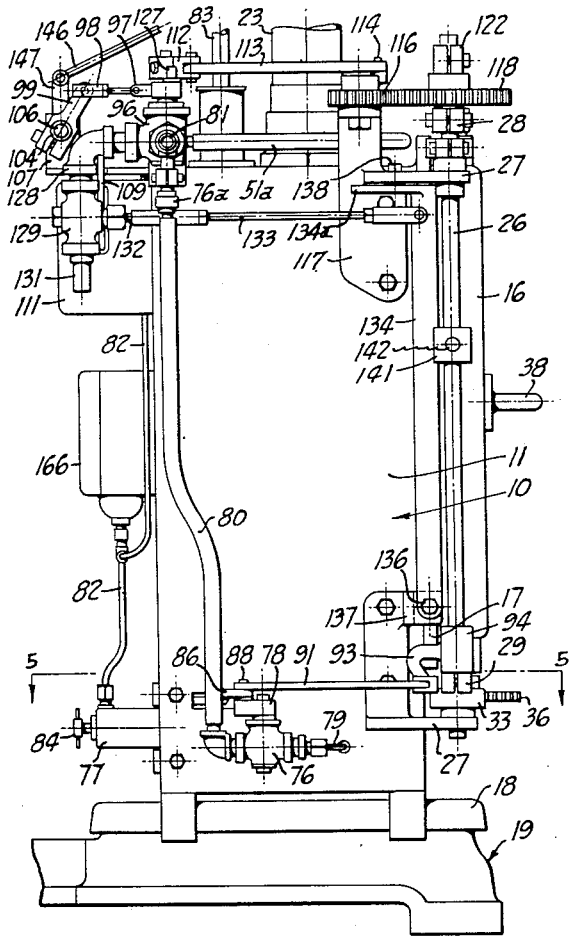
FIG_4_
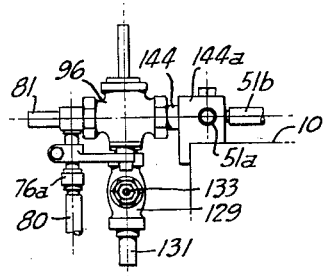
FIG_6_
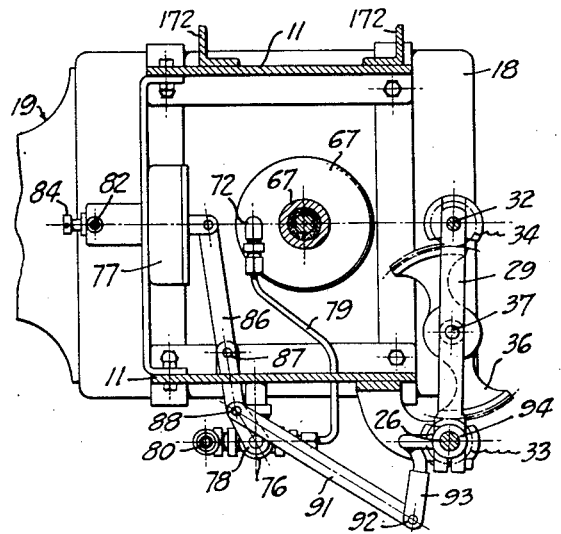
FIG_5_
INVENTOR
*DAVID D. PEEBLES.*
*GUY P. HENSLEY.*
BY
ATTORNEY Sept. 7, 1948.  D. D. PEEBLES ET AL  2,448,733
POWDER FILLING APPARATUS
Filed Sept. 20, 1943  5 Sheets-Sheet 4
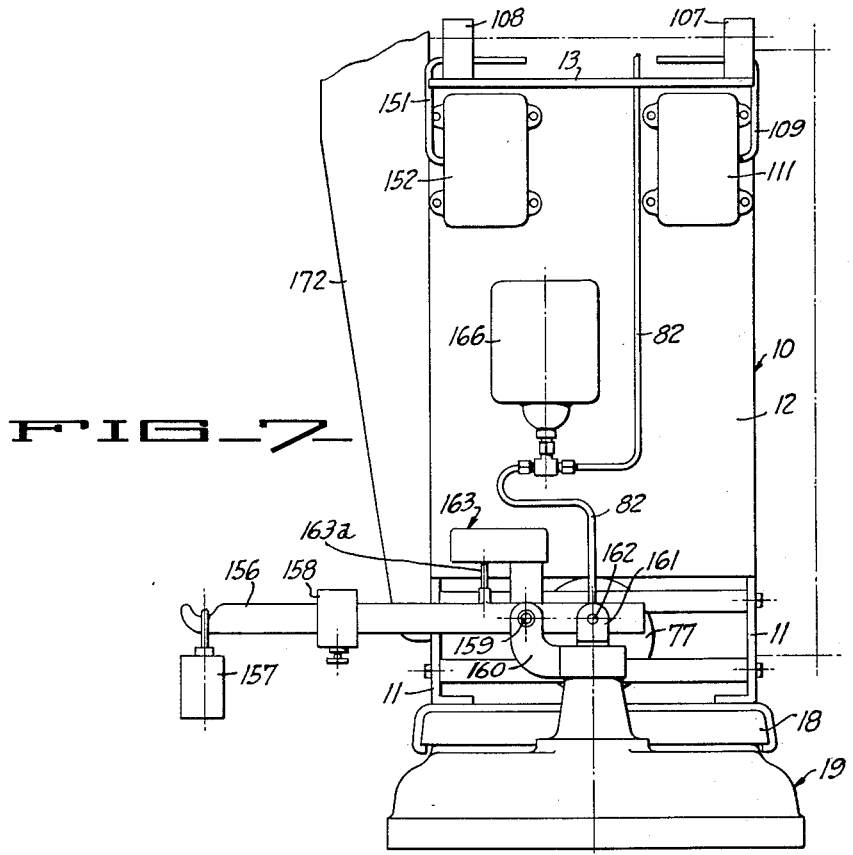
FIG_7
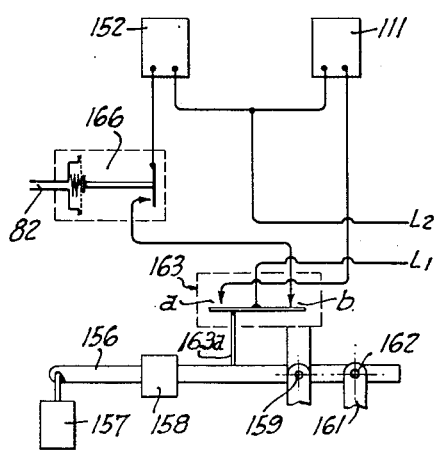
FIG_8
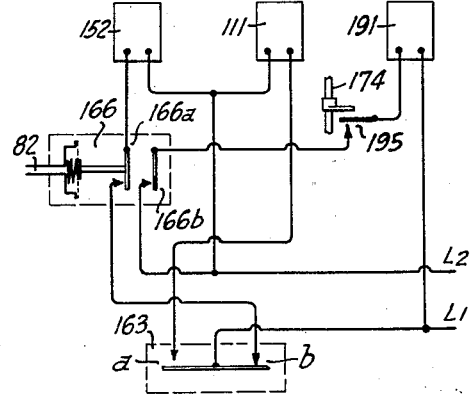
FIG_13
INVENTORS
DAVID D. PEEBLES.
GUY P. HENSLEY.
BY Paul O. Fisher
ATTORNEY Sept. 7, 1948.                    D. D. PEEBLES ET AL                    2,448,733
                                POWDER FILLING APPARATUS
Filed Sept. 20, 1943                                              5 Sheets-Sheet 5
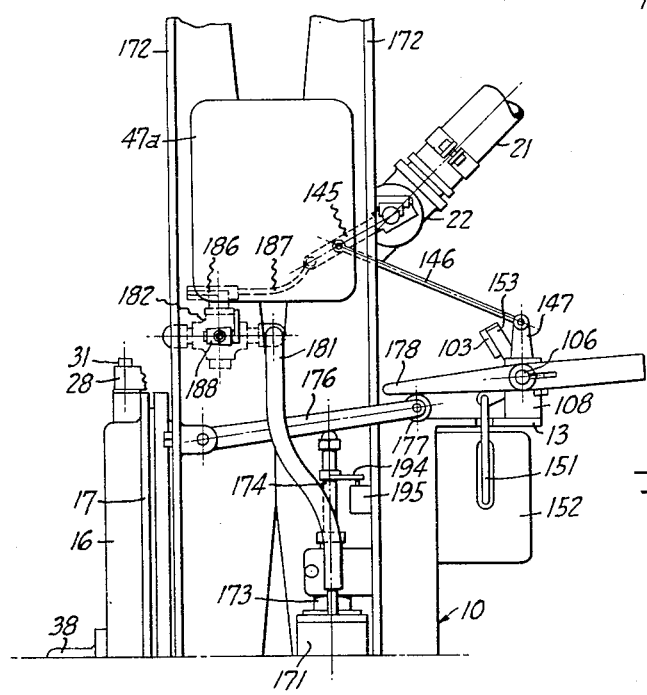
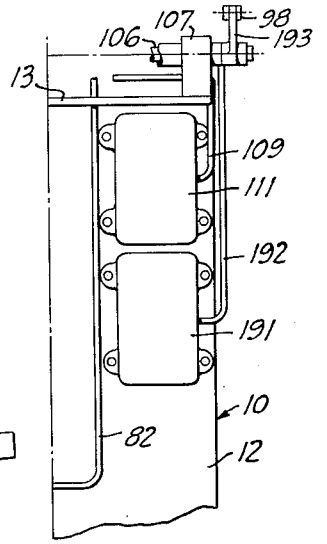
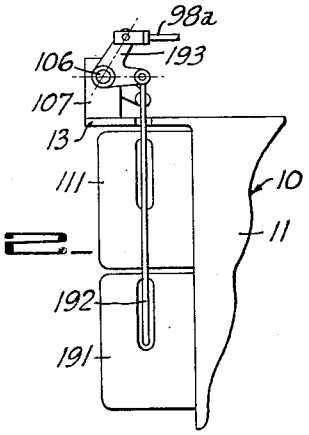
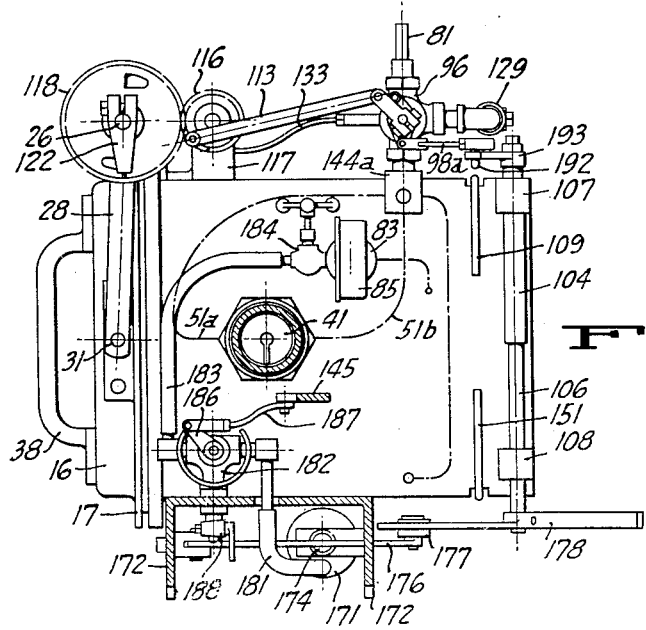
INVENTOR
DAVID D. PEEBLES
GUY P. HENSLEY
BY Paul D. Flehr
ATTORNEY Patented Sept. 7, 1948

2,448,733

UNITED STATES PATENT OFFICE 2,448,733

POWDER FILLING APPARATUS

David D. Peebles, Hillsborough, and Guy P. Hensley, San Francisco, Calif., assignors to Golden State Company, Ltd., San Francisco, Calif., a corporation of Delaware Application September 20, 1943, Serial No. 503,082

10 Claims. (Cl. 249—62)

This invention relates generally to apparatus for the filling of containers with predetermined quantities of various powdered materials, such as dried milk products and the like.

A general object of the invention is to provide an apparatus for the filling of containers without human contact with the powder, and at a relatively rapid rate.

Another object of the invention is to provide a powder filling apparatus characterized by use of suction or vacuum for causing rapid flow of powder through a pipe or conduit to a closed chamber in which the container to be filled is introduced.

Another object of the invention is to provide filling apparatus of the above character having novel provision for automatic control of the powder flow, to secure a relatively accurate predetermined weight of material within the container.

Another object of the invention is to provide novel means for controlling certain operations automatically in conjunction with introduction and removal of the container from the vacuum chamber. In this connection the invention is characterized by having certain parts operated by movement of the door or closure for the container.

Another object of the invention is to provide apparatus of the above character having novel provision for removing air from the container while powder is introduced into the same, but without loss of powder which may tend to be entrained in the air.

Additional objects and features of the invention will appear from the following description in which the preferred embodiment has been set forth in detail in conjunction with the accompanying drawing.

Referring to the drawing—

Figure 1 is a front elevational view showing a machine incorporating the present invention.

Figure 2 is a cross sectional view taken along the lines 2—2 of Figure 1.

Figure 3 is a side elevational view, in section, and on an enlarged scale.

Figure 4 is an end elevational view of the machine.

Figure 5 is a cross sectional view taken along the lines 5—5 of Figure 3.

Figure 6 is a fragmentary view of a part of the machine.

Figure 7 is a fragmentary rear view of the machine.

Figure 8 is a circuit diagram showing electrical connections employed.

Figure 9 is a side elevational view showing an upper portion of a modified machine incorporating the present invention.

Figure 10 is a plan view of the modified machine, shown in Figure 9.

Figure 11 is a detail illustrating the additional solenoid employed with the modification of Figures 9 and 10, and which serves to operate the vacuum control valve independently of the powder control valve.

Figure 12 is a detail showing substantially the same parts as Figure 11, but looking towards the right-hand end of Figure 11.

Figure 13 is another circuit diagram showing suitable electrical connections for the embodiment of Figures 9 to 12 inclusive.

The machine as illustrated in the drawing consists generally of a chamber 10, which is adapted to receive the container or carton to be filled. In this instance the chamber is in the form of a simple rectangular box, including the side walls 11, back wall 12, and the top and bottom walls 13 and 14 (Fig. 3). The front open face of the chamber is provided with a door 16, having a flanged edge 17 for engaging and sealing upon the adjacent face of the chamber. Before proceeding with a detailed description of the parts associated with the chamber 10, it can be pointed out that this chamber and the parts attached to the same are supported by a base upon the movable platform 18 of the weighing scales 19. The type of weighing means employed can vary in different instances depending upon the size and character of chamber 10 and the size of container being filled. In conjunction with the upper part of the chamber (Figure 3) a hose 21 makes a connection through valve 22 with a powder filling tube or pipe 23. Hose 21 leads to the lower portion of a hopper or storage tank containing the powder to be introduced into the containers. Valve 22 controls the flow of powder to the filling pipe 23, and this pipe in turn introduces the powder into the container.

The door 16 has mounting means whereby it moves between open and closed positions, and this mounting means preferably maintains the door parallel to the front face of the chamber 10. The mounting means in this instance includes a vertical shaft 26, which is journaled by brackets 27 attached to the chamber. Upper and lower arms 28 and 29 are attached to shaft 26, and trunnions 31 and 32, mounted upon the door, provide pivotal connections with the door on a vertical axis. Pinions 33 and 34 are attached to the lower ends of shaft 26 and to trunnion 32 respectively. A segmented gear 36 is pivotally mounted upon arm 29 by pin 37, and at diametrically opposite points meshes with the pinions 33 and 34 (Figure 5). Thus when the door is swung between open and closed positions, by grasping the handle 38, it is kept in a plane parallel to the face of the chamber, and is caused to swing about the axis of shaft 26.

As previously explained the filling tube 23 introduces powder into a container placed within the chamber 10 and this tube extends downwardly through the top wall 13. To prevent possible clogging of powder within this tube, it is provided with agitating means preferably in the form of a feed screw 41. The upper end of feed screw 41 is shown provided with a coupling 42 to the shaft 43, and this shaft in turn is surrounded by stuffing gland 44. The upper exterior end of shaft 43 is shown provided with a coupling 46 to the electric motor 47. Thus the feed screw 41 is driven at a relatively rapid speed when the motor is energized. The current supply to the motor 47 is controlled by the relay or switch box 47a, and this in turn is controlled by a mercury switch 47b mounted upon the rotatable operating member of powder control valve 22 (Fig. 3). Therefore the motor is operated only during intervals when valve 22 is open.

The lower portion of the powder filling pipe 23 includes the pipe section 23a, which is surrounded by the sleeve coupling 48. Thus an annular space 49 is formed between sleeve 48 and the pipe section 23a, which is connected to the evacuating pipes 51, and which is in communication with the upper portion of chamber 10.

It will be evident that the container to be filled will vary as to form in different instances. However in this instance the container 52 illustrated is of simple rectangular type, formed of sheet metal, and provided with a top wall 53 having a circular opening 54. During a filling operation the entire container is raised upwardly as will be presently explained, and after a filling operation it is dropped downwardly for removal. When the container is urged upwardly a seal is formed between the top wall 53 and the top wall 13 of the chamber, to avoid escape of powder. Thus for this purpose a ring 56 of suitable material such as medium soft rubber, is disposed upon the lower face of the top wall 13, and is retained in place by metal ring 57. The raised flange 58 of the container which surrounds opening 54, is adapted to engage the ring 56.

When powder is being introduced through pipe 23 into a container, there is a tendency for considerable powder to become entrained with the air, and to pass out of the container together with the air being withdrawn through space 49 and pipes 51. Such powder is removed from the air stream by a filter so constructed that at the end of the filtering operation, all powder accumulated by the filter is dislodged and returned to the container. Thus a suitable filter membrane 59 is shown stretched between ring 57 and the lower end of pipe 23, and is formed of suitable material such as a filter cloth. The inner edge of this cloth is shown clamped to the lower end of pipe section 23a by retaining ring 61, while the outer edge portion is shown retained by ring 62 and the outer spring retaining ring 63. During a filling operation powder filtered from the air collects upon the lower side of cloth 59. At the end of a filling operation when a back flow of gas occurs through the filter cloth, such collected powder is dislodged and caused to return to the container. Radially extending fingers 64 are shown overlying the filter cloth 59 in order to prevent collapsing of this cloth upon the wall 13.

Reference has been made to elevating the container 52 during a filling operation. This is done automatically by means associated with the lower end of the chamber. The means illustrated for this purpose includes a cylinder 67, carried by the chamber below the bottom wall 14. Immediately above the bottom wall 14 there is a plate or platform 68, arranged to support the container 52, and which is attached to the upper end of a piston rod 69. A piston 71 is attached to the lower end of rod 69, and is fitted within cylinder 67. A pipe 72 connects with the space above piston 71, and is adapted to be connected to a source of vacuum through suitable valve control means, as will be presently explained. When vacuum is applied through pipe 72, piston 71 is raised together with rod 69 and platform 68, to elevate container 52 to its uppermost position as shown in Figure 3.

The means provided for controlling the elevating means described above includes a vacuum control valve 76, in conjunction with a vacuum operated device 77 of the diaphragm type. Valve 76 can be a simple three way plug cock, having its valve member operated by an arm 78. One side of this valve connects with tube 79, which in turn leads to the pipe 72 on the cylinder 67. The other side of valve 76 connects with the hose or pipe 80 which in turn connects with pipe 81 through check valve 76a. Pipe 81 connects with a vacuum pump or like source of vacuum.

Device 77 simply includes a flexible diaphragm (not shown), with the mounting of this diaphragm forming a chamber on one side of the same, while leaving the other side of the diaphragm exposed to atmospheric pressure. A pipe 82 connects the chamber of device 77 to an air filter 83, which in turn communicates with the interior of chamber 10. An adjustable screw 84 constitutes part of a needle valve for regulating the degree of restriction in the communication between the chamber of device 77, and the pipe 82. Vacuum gauge 85 is shown connected to filter 83.

The diaphragm of device 77 is connected to one arm of a lever 86 (Figure 5), and this lever has a stationary fulcrum 87 to the supporting base of the chamber 10. The other arm of lever 86 has a pivotal connection 88 with the arm 78 of valve 76. Thus when vacuum is applied to device 77 the lever 86 is rotated in a counterclockwise direction as viewed in Figure 5, to turn arm 78 to open valve 76, and thus cause application of suction to the cylinder 67.

In conjunction with automatic operation of valve 76 by pressure operative device 77, it is desirable to restore valve 76 to closed position by final opening movement of the door 16. This makes it possible to hold the container in an elevated position following a filling operation, and until the door 16 has been swung completely open. For this purpose the pivot 88 of arm 78 is also connected to a link 91 (Fig. 5), which in turn has a pivotal connection 92 to the arm 93. A hub 94 forms a mounting for arm 93, and is journaled upon the shaft 26 (Fig. 1). Thus during the initial turning of shaft 26 in conjunction with opening movement of door 16, arm 93 remains stationary. However eventually the lower arm 29 engages the arm 93, so that during final opening movement arm 93 is rotated in a clockwise direction as viewed in Figure 5, to move link 91 to the left to close the valve 76. When valve 76 is in the closed position shown in Figure 5, communication between pipes 79 and 80 is interrupted, and tube 79 is vented to the atmosphere through a valve port (not shown).

To control application of vacuum to the chamber 10 and to the container being filled with powder, a control valve 96 is provided, which also can be of the three way plug cock type as shown, with its valve member controlled by arm 97. Arm 97 is connected to operating means including the link 98, which pivotally connects with the free end of arm 99. Arm 99, together with arms 101, 102 and 103, are fixed to a tubular shaft 104, which is journaled upon an inner shaft 106. This assembly is disposed upon the rear side of chamber 10 (see Fig. 2) and is held by the fixed journal brackets 107 and 108. The free ends of arms 101 and 102 pivotally connect with the operating member 109 of an electrical solenoid 111 of the repulsion type. Thus when solenoid 111 is actuated shaft 104 is rotated to swing arm 99, and thus turn the arm 97 of control valve 96 in a counterclockwise direction as viewed in Fig. 2 (i. e., from open to closed position). In conjunction with the solenoid for operating valve 96, means is provided for resetting valve 96 (to open position) responsive to closing movement of the door 16. Thus an arm 112 is pivotally mounted concentric with the axis of the plug for valve 96, and its free end is pivotally connected to link 113. The other end of link 113 has a pivotal connection 114 with a pinion 116. A bracket 117 forms a mounting for pinion 116, and the pinion is adapted to mesh with a gear 118, which is loosely journaled immediately above arm 28 on the shaft 26 (see Fig. 1). The upper face of gear 118 is provided with diametrically opposed cavities 119 (Fig. 2) to afford shoulders 121. Above the gear 118 the shaft 26 carries an arm 122, the free end of which has a downwardly urged detent or pawl 123. Assuming that the door is swung to full open position through an angle of slightly more than 180°, from the position shown in Fig. 2, pawl 123 drops into that cavity 119 farthest from the chamber, and then when the door is again swung to closed position, gear 118 is rotated ½ revolution. The ratio between gears 116 and 118 is such that for ½ revolution of gear 118, gear 116 is rotated one complete revolution. Thus link 113 is reciprocated to oscillate arm 112. The arm 97, which is attached to the rotary plug of valve 96, has an extension 126 carrying an abutment pin 127. When arm 112 is turned in a clockwise direction pin 127 is engaged so that such movement carries with it the arm 97. Thus arm 97 is re-set to its initial open position, after being moved to closed position by the solenoid 111.

One side of valve 96 connects with a pipe 128, which in turn connects with a second valve 129. The other side of valve 129 connects with pipe 131, which can be vented to the atmosphere, but which preferably connects with a source of inert gas, such as a tank containing nitrogen gas. Valve 129 can be of conventional type provided with a spring urged valve operating stem 132 adapted to be reciprocated between open and closed positions. The operating stem 132 is shown attached to a rod 133 which extends forwardly for connection with a swinging bar 134. The lower end of bar 134 has a pivotal connection 136 to the bracket 137, and the upper end is loosely retained for limited swinging movement by a screw or stud 138 (Fig. 4). This screw or stud is mounted on the upper one of the brackets 27 and its lower end extends into a slot (not shown) in an arm 134a attached to the upper end of arm 134. Mounted upon shaft 26 there is a collar 141, which has a projecting stud 142 adapted to engage the adjacent edge of bar 134. Collar 141 is set so that for the final portion of the closing movement of door 16, stud 142 engages the adjacent edge of bar 134 and moves this bar rearwardly, to open the valve 129. Conversely when the door swings to open position, during the initial portion of its movement valve 129 is automatically closed.

In connection with opening of the door 16 it may be explained that spring means is utilized in conjunction with this door so that after a filling operation and when the interior of the chamber 10 has been restored to atmospheric pressure, the door automatically swings open a limited amount. Such means may be one or more simple leaf springs 143 attached to the inner face of the door (Fig. 3) and adapted to engage the adjacent face of the container 52.

That side of valve 96 opposite to pipe 81 (Fig. 2) is connected to a pipe 144 which in turn connects to the distribution block 144a and the distributing pipes or hoses 51a, 51b and 51c. Hoses 51a and 51b connect to the pipes 51, while hose 51c connects directly with the interior of chamber 10 at a point exterior of the container being filled.

Reference has been made to the valve 22, which controls admission of powder from the hose 21. For the automatic operation of this valve its operating stem is attached to an arm 145, the free end of which is attached to an operating link 146 (Fig. 3). The other end of link 146 is attached to arm 147, which in turn is mounted upon the shaft 106. Arms 148 and 149 are likewise attached to shaft 106, and to the operating member 151 of an electrical solenoid 152 more completely illustrated in Figures 7, 8 and 9. By operation of solenoid 152 shaft 106 is rocked to swing valve operating arm 145 in a direction to open the valve 22. As viewed in Figure 3 valve 22 is open and it is closed when arm 145 is swung in a counterclockwise direction. Shaft 106 carries an additional arm 153 which cooperates with the arm 103 on shaft 104. Arm 103 carries a shoulder or ledge which extends into the path of movement of arm 153, whereby the shafts 106 and 104 are locked together for rotation applied to shaft 104 in one direction only.

The weighing scales 19 can be of conventional construction, and should have some convenient movable part for relatively sensitive operation of controlling contacts. The scales indicated are shown provided with a weighing beam 156 having the weights 157 and 158, and fulcrumed at 159 to a fixed support 160. The movable post element 161 of the scales, which is connected to the platform, is fulcrumed to the beam at 162. Support 160 serves as a mounting for the switch 163, which has contacts for controlling the electrical circuit connections to the solenoids 111 and 152 and device 166. Motion is transmitted from this beam to switch by pin or rod 163a.

Circuit connections which can be employed are shown in Figure 8. Briefly the switch 163 in this instance is of the double pole type, having two pairs of contacts a and b. One side of contacts a connect to current supply line L1, and the other side connects to one terminal of the solenoid 111. One side of contacts b likewise connects to current supply line L1, while the other side connects to one of the electrical contacts of a pressure responsive switch 166. This switch (see Fig. 4) has its pressure cell connected to pipe 82, which as previously explained connects to chamber 10. It can be of conventional type with a diaphragm or Sylphon tube operating a mercury switch or set of contacts. The other contact of switch 166 connects to one terminal of solenoid 152. The two other terminals of solenoids 111 and 152 are shown connected together and to the other current supply line L2. With this arrangement it is evident that contacts $a$ and $b$ are opened and closed depending upon the position of the weighing beam 156. When no vacuum is applied to switch 166, its contacts are open. However when a predetermined amount of vacuum has been applied, the contacts of this device are closed. Now assuming that contacts $b$ of switch 163 are likewise closed, current is applied to solenoid 152. As will be presently explained this commences a powder filling operation. At the end of the powder filling operation the weighing beam 156 swings upwardly to a balanced position, indicating a predetermined weight, and this serves to open contact $b$ and at the same time to close contact $a$. Thus solenoid 111 is energized. As will be presently explained energizing of solenoid 111 causes the powder control valve 22 to be closed and also causes closing of valve 96 to the source of vacuum with breaking of the vacuum in chamber 10 by inflow of nitrogen gas.

The operation of the apparatus and the carrying out of the method can now be reviewed as follows:

Assuming that one starts with the door 16 in full open position, a container to be filled with powder is introduced into chamber 10 to rest upon the platform 68. At this time the platform is in its lowered position with sufficient clearance above the container to clear the ring 57. The next operation is to swing the door 16 to closed position whereby a seal can be established upon the face of the chamber. Valve 96 is now in a position in which pipes 81 and 144 are in communication whereby the interior of the chamber and also the interior of the container are rapidly evacuated. As soon as there is an appreciable reduction of pressure within the chamber the door 16 is held shut by exterior atmospheric pressure.

While the pressure is being reduced within the chamber 10 and before it has been reduced to a value sufficient to close the contacts of device 166, the diaphragm of device 77 is moved by application of vacuum to cause motion to be transmitted through lever 86 to the arm 78 of valve 76. Such movement opens valve 76 to permit exhausting air from the cylinder 67 through pipe 79, valve 76 and suction pipe 80. Thus piston 71 is raised to elevate the platform 68 and to press the upper end of the container against the sealing ring 56.

As the evacuation of the chamber continues the pressure is reduced to a value ample to cause conveyance of powder from the associated powder hopper or tank and through the rubber hose 21 connected to the filling pipe 23. Pressure responsive device 166 then closes its electric contacts with the result that the opening solenoid 152 is actuated. Actuation of this solenoid causes the valve 22 to be opened with movement of arm 153 to the position illustrated in Figure 3. Immediately a stream of powder flows from hose 21 through valve 22 and downwardly through pipe 23 into the container. Some air is drawn into the container together with the powder and this air is withdrawn through the filter cloth 59, passage 49 and the evacuating hoses 51$a$ and 51$b$. Powder which may be entrained with the air passing through filter cloth 59 collects upon the lower side of this cloth.

When the container is substantially filled with powder the added weight of this material is sufficient to balance the weighing scales with the result that movement of beam 156 to a balanced position causes opening of switch contacts $b$ and closing of contacts $a$. This causes flow of current through the closing solenoid 111 with the result that shaft 104 is rocked to swing arm 99 in a direction to turn the valve member of valve 96 to closed position. Simultaneously the shoulder on arm 103 swings arm 153 in a clockwise direction (as viewed in Figure 3) with the result that the arm 145 of powder control valve 22 is moved rapidly to closed position.

The porting provided in the stationary and movable parts of plug valve 96 is such that when communication between pipes 81 and 144 is interrupted, pipe 128 is placed in communication with pipe 144 whereby nitrogen gas from a source connected with pipe 128 is caused to flow back through valve 96, pipe 144, distributing block 144$a$ and hoses 51$a$, 51$b$ and 51$c$ into the chamber 10 and the interior of the container. It will be noted that at this time the valve 129 is held open by virtue of engagement of bar 134 with the stud 142 on collar 141.

When the pressure within chamber 10 has thus been increased to substantially atmospheric the door 16 is swung to partially open position by the urge of relief springs 143. This initial opening movement permits rocking of bar 134 with transmission of motion through rod 133 and operating stem 132 to cause closing of valve 129, thus preventing further discharge of nitrogen from pipe 131.

The operator now grasps the handle 38 and continues opening movement of the door, to a position slightly beyond 180° with respect to closed position. During such movement gear 118 and its associated pinion 116 remain stationary. For the final portion of opening movement of the door 16 the lower arm 29 engages the arm 83 (Figure 5) and causes sufficient motion to be transmitted to valve arm 78 through link 91 to close the valve 76. Valve 76 as previously explained is ported in such a manner that when in closed position pipe 79 is vented to the atmosphere. Therefore final opening movement of the door is accompanied by a venting of the elevating cylinder through pipe 79 with the result that the platform 68 together with the filled container moves downwardly to permit its removal from the chamber.

After removal of the filled container, a new empty container is inserted and the operation repeated. During closing movement of the door upon the next container, gear 118 is rotated one-half revolution to rotate pinion 116 one complete revolution. This oscillates link 113 and arm 112 in the manner previously described to reset the valve 96 to open position with suction pipe 81 and pipe 144 in communication. Such resetting likewise is accompanied by swinging of arm 103 together with its shoulder in a counterclockwise direction as viewed in Figure 3 with the shoulder being annularly separated from the arm 153.

During a filling cycle, that is while valve 22 remains open, motor 47 and screw 41 are in continuous operation to prevent blocking or clogging.

After a filling cycle motor 47 and screw 41 are stopped, thus preventing any loose powder from falling before the next filling cycle.

In place of venting the interior of the chamber with nitrogen gas at the end of a filling operation it is feasible to vent directly into the atmosphere. However in the handling of products which are deteriorated by contact with air (i. e., powdered milk products) it is desirable to utilize a relatively inert gas. Use of an inert gas in the manner described results in substantially complete filling of the container with the inert gas so that if the container is sealed by a closure immediately after filling, practically all oxygen will be excluded.

A check valve 76a inserted in the pipe line 88 is not essential but is desirable to prevent possible lowering of the elevating device in the event of temporary failure of the source of vacuum.

It has been found that use of suction or vacuum is a highly efficient method of causing rapid flow of powder through a rubber hose or like pipe, from a storage hopper. Powders such as dried whole milk, skim milk and the like have been handled in this manner without difficulty with respect to clogging or caking during transit. It appears that during flow from a storage tank through the rubber hose to the point of discharge in the vacuum chamber, there is continual expansion of entrapped air associated with the powder and this continual expansion while the material is in transit prevents clogging. Likewise it appears that radial contraction and expansion of the resilient walls of the rubber hose plays a part in preventing clogging, as it tends to prevent caking or like accumulation of material upon the inner walls.

Where powdered material is at an elevated temperature it is appreciably cooled in transit through hose 21 and during filling of a container. Such cooling occurs because of expansion of air associated with the powder and because of some evaporation of moisture which may occur at the reduced pressures involved. Thus it is feasible to handle and package desiccated powdered milk which has been processed in spray drying equipment before the powder has had an opportunity to cool, without producing too high a temperature in the container or carton. Assuming use of nitrogen gas for breaking the vacuum, the apparatus and method in such instance serves to cool the powder, to remove some additional moisture, and to replace entrapped air with a non-oxidizing gas.

One characteristic of the machine described above is that closure of the powder control valve 22 occurs simultaneously with operation of the valve 96 to shut off the communication between the interior of the chamber and the source of vacuum. In addition closure of valve 22 after a desired weight of powder has been obtained, occurs from full open position. Thus the degree of vacuum within the chamber is never greater than the vacuum existing at the time of powder cut-off, and never greater than that which can be obtained while the valve 22 is in full open position. In many instances it is desirable to attain somewhat higher vacuums, thus causing more efficient displacement of entrained oxygen with nitrogen or other inert gas. The embodiment illustrated in Figs. 9 to 13 inclusive accomplishes this result, together with more accurate measurement of powder, by throttling down the powder control valve 22 towards the end of the filling cycle. While this in itself enables building up of substantially higher vacuums within the chamber, before operation of the vacuum control valve 96, it has been found desirable to provide further means for completely closing the powder control valve 22 prior to operation of the valve 96. This permits a time lapse after the powder filling cycle during which relatively high evacuation is possible, prior to operation of valve 96 to break the vacuum and permit nitrogen or like inert gas to enter the main chamber.

Referring to Figs. 9 to 13 inclusive, the embodiment shown includes a pneumatic operator 171 which is mounted upon one of the vertical frame members 172. This pneumatic operator includes a cylinder fitted with a piston urged downwardly by a weight or spring, and with a pipe connection 173 to the space above the piston. The space below the piston can be vented to the atmosphere. A rod 174 attached to the inner piston extends upwardly and has its upper end adapted to abut a pivotally mounted arm 176. The free end of this arm carries a roller 177 which engages the underside of a finger 178. The finger 178 is fixed to the shaft 106 whereby when arm 176 is forced upwardly by piston rod 174, shaft 106 is rocked in a clockwise direction as viewed in Fig. 9 to turn the operating lever 145 of valve 22 towards closed position.

Application of suction to the operator 171 is by way of a suction hose or tube 181 which connects with fitting 173 and which leads to one side of a small valve 182 (Fig. 10). Hose or tube 183 also connects this valve to the air filter 83, through the hand throttling valve 184.

The valve plug or like operating member of valve 182 has an operating arm 186, which is connected by link 187 to the operating arm 145 of the powder control valve 22. The porting of valve 182 is such that arm 186 has two limiting operating positions corresponding respectively to full open and closed positions of the powder valve operating arm 145. For the position shown in Fig. 10, corresponding to full open position of arm 145, tubes 181 and 183 are in communication to apply suction to the operator 171. However when arm 186 is turned clockwise to its other limiting position, communication between tubes 181 and 183 is interrupted, and tube 181 is placed in communication with the adjustable venting cock 188. By the adjustment of this cock one can control the rate with which piston rod 174 returns to its lowermost initial position.

Referring to Fig. 11 an additional supplemental solenoid 191 is provided for operating the valve 96. The operating member 192 of this solenoid is connected to one arm of an L crank 193, the other arm of which connects through link 98a to the operating arm of valve 96 (Fig. 12). L crank 193 is loosely mounted upon shaft 106.

Fig. 13 shows suitable electrical connections for the supplemental solenoid 191. One side of the solenoid is shown directly connected to one of the current supply lines L1, while the other side is connected in series with the switches 195 and 166b. Switch 166b is simply an additional set of contacts for the vacuum operated switch 166, the contact 166a of which controls the solenoid 152. Switch 195 is arranged to be operated by the positioning of the piston rod 174. Thus as indicated diagrammatically in Fig. 9 this switch can be mounted adjacent the piston rod, and operated by finger 194 adjustably carried by the rod. When piston rod 174 is in its lowermost position, the contacts of switch 195 are closed. However when the piston rod is elevated, as during a filling cycle, the contacts 195 are open.

Thus solenoid 191 is energized after the piston rod 174 has returned to its initial lowermost position, which occurs after a predetermined interval following complete closure of the powder control valve 22.

Operation of the embodiment described above with reference to Figs. 9 to 13 inclusive, can be reviewed as follows: A filling operation is commenced the same as for the machine of Figs. 1 to 8 inclusive. However when the powder control valve 22 is open, valve 182 is likewise operated to apply suction to the pneumatic operator 171. Therefore the piston rod 174 commences to move upwardly at a predetermined speed determined by the setting of valve 184, whereby toward the end of the filling cycle arm 176 is raised to rock the shaft 106 and thus move the arm 145 to partially close off valve 22. Thus by the time the end of the powder filling cycle is reached, the rate of powder flow has been greatly reduced and correspondingly it is possible for the vacuum pump attached to the vacuum chamber to pull a relatively high vacuum. In addition the reduced flow of powder into the package being filled makes possible a more accurate weighing operation. When the desired weight of powder in the carton has been reached, the powder closing solenoid 111 is operated in the same manner as previously described, to completely close the valve 22. This likewise causes closing of valve 182, with venting of tube 181 to the atmosphere through the venting valve 188. Piston rod 174 immediately starts downwardly at a predetermined rate of speed, depending upon the setting of venting valve 188. After a predetermined interval it reaches its lowermost position to close switch 195, to actuate solenoid 191, and thus operate valve 96 to interrupt further application of suction, and to introduce an inert gas like nitrogen, as previously described. During the interval required for piston 174 to reach its lowermost position there is an opportunity for further evacuation of the chamber, thus permitting attainment of a relatively high vacuum before operation of valve 96. As previously stated this makes far more complete replacement of entrained oxygen of the powder, with inert gas.

Should one desire to omit the special operating features of Figs. 9 to 13 inclusive, it is only necessary to close the valve 184, thus making the pneumatic operator 171 inoperative.

We claim:

1. In apparatus for filling containers with powder, a chamber adapted to receive a container to be filled, a filling pipe communicating through the upper end of the chamber and adapted to deliver a stream of powder to the container, elevating means serving to lift the container while within the chamber, means for connecting the interior of the chamber to a source of vacuum, means forming a seating surface extending about the delivery end of the filling pipe and against which the upper end of the container is adapted to seat when the container is lifted by the elevating means, a pipe communicating with the chamber at a point between the discharge end of the filling pipe and said seating surface, whereby when the container is elevated gas from the interior of the container is exhausted through said pipe, and a filter membrane extending across the inner open end of said pipe whereby powder is prevented from entering the same.

2. In apparatus for filling containers with powder, a chamber adapted to receive a container to be filled, the chamber including a door for permitting removal or introduction of the container, means serving to mount the door for swinging movement between open and closed positions, means serving to connect the interior of the chamber to a source of vacuum, valve means for controlling said last named means, means operated by the swinging of the door to closed position to effect opening of said valve means, a filling pipe communicating with the chamber and adapted to deliver a stream of powder to the container, valve means serving to control flow of powder through the filling pipe, means responsive to a predetermined degree of vacuum within the chamber for effecting opening of said last named valve means, and means responsive to introduction of a predetermined amount of powder into the container for effecting closure of the valve means for the filling pipe, for effecting closing of the valve means controlling communication with the source of vacuum, and for venting gas into the chamber to reduce the pressure therein to substantially atmospheric.

3. In apparatus for filling containers with powder, a chamber adapted to receive a container to be filled, means for evacuating the chamber, a filling pipe communicating to the upper portion of the chamber and adapted to deliver a stream of powder to the container, valve means for controlling flow of powder through the filling pipe, and agitating means disposed between the valve means and the inner discharge end of the filling pipe, for preventing clogging of powder.

4. In apparatus for filling containers with powder, a chamber adapted to receive a container to be filled, means for evacuating the chamber, a filling pipe communicating through the upper portion of the chamber and adapted to deliver a stream of powder to the container, means for elevating the container, a door for the chamber, means mounting the door for swinging movement between closed and open positions, means connecting the interior of the chamber to a source of vacuum, means serving to cause operation of said elevating means to raise the container into a position to receive powder from the filling pipe when the interior of the chamber is partially evacuated, and means serving to cause said elevating means to lower the container responsive to swinging of the door to full open position.

5. In apparatus for filling containers with powder, a chamber adapted to receive a container to be filled, a filling pipe communicating with the chamber and adapted to deliver a stream of powder to the container, valve means for controlling flow of powder through the filling pipe, means serving to connect the chamber to a source of vacuum, weighing means responsive to the amount of powder delivered to the container, means responsive to application of a predetermined degree of vacuum to the interior of the chamber for opening of said valve for a filling cycle, means for automatically causing a partial closing of said valve during the latter part of a filling cycle, and means controlled by said weighing means for causing automatic complete closure of said valve when a predetermined amount of powder has been delivered to the container.

6. In apparatus for filling containers with powder, a chamber adapted to receive a container to be filled, a filling pipe communicating with the chamber and adapted to deliver a stream of powder to the container, valve means for controlling flow of powder through the filling pipe, means serving to connect the chamber to a source of vacuum, valve means serving to control said connection whereby said chamber can be either connected to the source of vacuum or can be vented, weighing means responsive to the amount of powder delivered to the container, means responsive to application of a predetermined degree of vacuum to the interior of the chamber for opening said powder control valve, means controlled by said weighing means for causing automatic closure of said powder control valve when a predetermined amount of powder has been delivered to the container, and means for effecting automatic operation of said vacuum control valve means at the end of a predetermined time interval following operation of the powder control valve.

7. In apparatus for filling containers with powder, a chamber adapted to receive a container to be filled, a filling pipe communicating with the chamber and adapted to deliver a stream of powder to the container, a powder control valve for controlling flow of powder through the filling pipe, piping serving to connect the chamber to a source of vacuum, valve means in said piping serving to permit either connection of the chamber to the source of vacuum or interruption of such connection with venting of the chamber to the atmosphere, weighing means responsive to the amount of powder delivered to the container, means responsive to application of a predetermined degree of vacuum to the interior of the chamber for opening said powder control valve, thereby commencing a powder filling cycle, means for effecting gradual closing of said powder control valve toward the end of a powder filling cycle, means controlled by said weighing means for causing automatic complete closure of said powder control valve when a predetermined amount of powder has been delivered to the container, and means for effecting automatic operation of said vacuum control valve to break the vacuum within the chamber at the end of a predetermined interval following complete closure of the powder control valve.

8. In apparatus for filling containers with powder, a chamber adapted to receive a container to be filled, a filling pipe communicating with the chamber and adapted to deliver powder to the container, a pipe serving to connect the chamber to a source of vacuum, a valve serving to control flow of gas through the pipe, a venting pipe adapted to connect to a source of inert gas, said valve when in closed position serving to connect the chamber to said venting pipe, weighing means responsive to a predetermined quantity of powder within the container for causing automatic closure of said valve, a second valve controlling flow of inert gas through said venting pipe, a movable door for the container, and means controlled by movement of the door for controlling the second valve to cause closure of the same when the door is opened.

9. In apparatus for filling containers with powder, a chamber adapted to receive a container to be filled, a filling pipe communicating with the chamber and adapted to deliver a stream of powder to the container, valve means for controlling flow of powder through the filling pipe, means serving to connect the chamber to a source of vacuum, weighing means responsive to the amount of powder delivered to the container, means responsive to application of a predetermined degree of vacuum to the interior of the chamber for opening said valve, motive means connected to the valve member for effecting closure of the same, and means responsive to the weighing of a predetermined amount of powder by the weighing means for controlling said motive means to cause application of force to the valve means to close the same, said last means being independent of vacuum in said chamber.

10. In apparatus for filling containers with powder, a chamber adapted to receive a container to be filled, a filling pipe communicating with the chamber and adapted to deliver a stream of powder to the container, a valve serving to control flow of powder through said pipe, a second pipe adapted to connect the chamber to a source of vacuum, a valve serving to control flow of gas through said second pipe, means responsive to application of a predetermined vacuum to the interior of the chamber for effecting automatic opening of the first named valve, weighing means responsive to the amount of powder introduced into the container, common motive means connected to both the first and second valves and adapted to close the same, means responsive to the weighing of a predetermined amount of powder by the weighing means for activating said motive means to close said valves, and means serving to introduce gas into the chamber responsive to activation of said motive means.

DAVID D. PEEBLES.
GUY P. HENSLEY.

REFERENCES CITED

The following references are of record in the file of this patent:

UNITED STATES PATENTS

| Number | Name | Date |
|---|---|---|
| 218,595 | Stoner | Aug. 12, 1879 |
| 320,363 | Judge | June 16, 1885 |
| 616,862 | Richards | Dec. 27, 1898 |
| 993,751 | Buschman | May 30, 1911 |
| 1,037,824 | Fasting | Sept. 3, 1912 |
| 1,075,903 | Dewey | Oct. 14, 1913 |
| 1,089,851 | McNeill | Mar. 10, 1914 |
| 1,244,508 | Kraner et al. | Oct. 30, 1917 |
| 1,591,932 | Young | July 6, 1926 |
| 1,647,351 | Hague | Nov. 1, 1927 |
| 1,670,924 | Bach | May 22, 1928 |
| 1,879,794 | Cundall | Sept. 27, 1932 |
| 1,940,635 | Soubier | Dec. 19, 1933 |
| 1,981,485 | Westin | Nov. 20, 1934 |
| 2,098,905 | Westin | Nov. 9, 1937 |
| 2,138,356 | Ryan et al. | Nov. 26, 1938 |
| 2,140,811 | Poole | Dec. 20, 1938 |
| 2,170,469 | Carter | Aug. 22, 1939 |
| 2,302,693 | Hoar | Nov. 24, 1942 |

FOREIGN PATENTS

| Number | Country | Date |
|---|---|---|
| 273,368 | Germany | Apr. 28, 1914 |